Aug. 9, 1932.                L. C. KING                1,871,183
                             SPECTACLES
                         Filed April 8, 1929
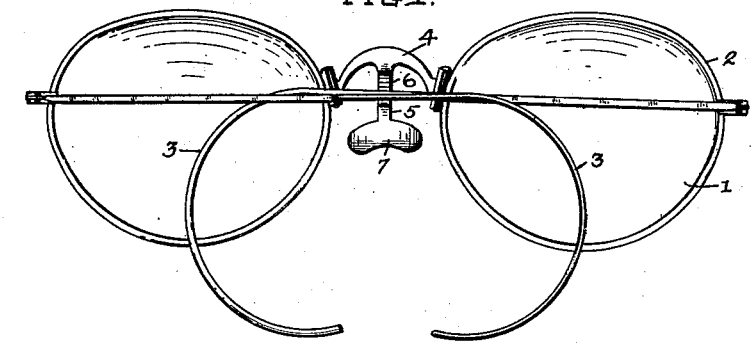
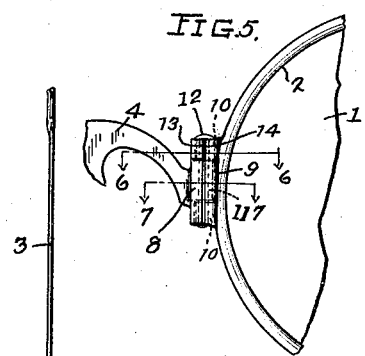
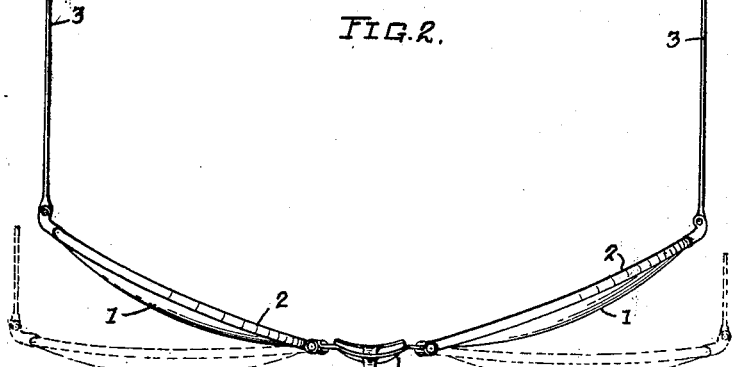
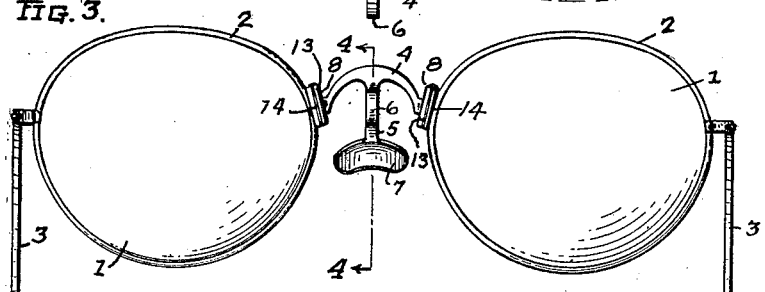
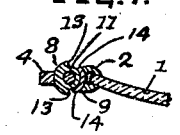
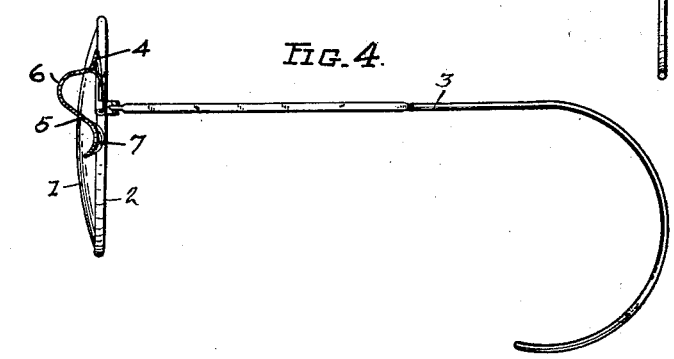
INVENTOR
Louise C. King
By
Frank S. Greene
ATTORNEY Patented Aug. 9, 1932

1,871,183

UNITED STATES PATENT OFFICE

LOUISE C. KING, OF CLEVELAND, OHIO

SPECTACLES

Application filed April 8, 1929. Serial No. 353,331.

This invention relates to spectacles and has for its object to provide spectacles which are adjustable to comfortably conform to the face of a wearer so that spectacles of one standard construction may be made to fit the face of anyone desiring to wear the spectacles.

A further object is to provide a combined bridge and nose piece which is attractive in appearance and which is formed of a metal which is readily bendable to facilitate the fitting of the spectacles to the face of the wearer.

A further object is to provide a connection between the bridge and the lenses which will permit of a slight relative angular movement sufficient to permit the lenses to move from a position conforming to the face of the wearer to a position in which the lenses lie in the same plane so that the spectacles will lie flat on the surface of the table or other support upon which they are laid and will occupy a minimum space in a spectacle case, the danger of breaking the lenses when the spectacles are not in use being thereby greatly lessened.

A further object is to provide a combined bridge and nose piece formed in one piece of bendable metal and so constructed that the bridge and nose piece supporting portions can be readily bent to vary the spacing of the lenses, to change the angular positions of the lenses and to adjust the nose piece inwardly and outwardly with respect to the plane of the bridge.

With the above and other objects in view, the invention may be said to comprise the spectacles as illustrated in the accompanying drawing hereinafter described and particularly set forth in the appended claims, together with such variations and modifications thereof as will be apparent to one skilled in the art to which the invention appertains.

Reference should be had to the accompanying drawing forming a part of the specification in which:

Figure 1 is a rear elevation of the spectacles with the temples folded across the lenses.

Fig. 2 is a top plan view of the spectacles in the position occupied by the spectacles when in use and showing in dotted lines the limit of angular movement of the lenses from the normal positions thereof permitted by the hinges.

Fig. 3 is a front elevation of the spectacles.

Fig. 4 is a central vertical section taken on the line indicated at 4—4 in Fig. 3.

Fig. 5 is a fragmentary elevation on an enlarged scale showing the hinge connection between the bridge and one of the lenses.

Fig. 6 is a section taken on the line indicated at 6—6 in Fig. 5; and

Fig. 7 is a section taken on the line indicated at 7—7 in Fig. 5.

In the accompanying drawing, the invention is illustrated as applied to spectacles of the type used for hunting, golfing or motoring in which the lenses are relatively large and the spectacle frame is designed to conform closely to the face of the wearer so that the lens rims closely overlie the face of the wearer.

The lenses which are indicated by the reference numeral 1 are shown of convex form and may be formed of a colored glass to lessen the glare of the sun. The lenses 1 are held in rims 2 to which may be attached the usual temples 3. The inner ends of the lenses are connected by a bridge 4 which is arched upwardly and bowed outwardly and this bridge is formed out of a metal which is readily bendable which will hold the shape to which it is bent so that by bending the bridge to increase the curvature of the arch or to increase the outward bow, the lenses may be adjusted toward or away from each other. At the center thereof, the bridge 4 is provided with an integral downwardly extending stem 5 which extends outwardly from the lower edge of the bridge portion and is bent inwardly on a relatively sharp curve to provide an outwardly projecting bow 6 which is readily bendable to vary the height of a nose piece 7 formed integrally with the lower end of the stem. The stem 5 may be bent to increase the curvature of the bow 6 to adjust the nose piece up or down with respect to the bridge 4 or about its point of connection to the bridge 4 to adjust the nose piece 7 inwardly or outwardly with respect to the plane of the bridge.

At the outer ends thereof, the bridge 4 is provided with downwardly converging hinge members 8 which interfit with hinge members 9 attached to the rims 2 of the lenses. The hinge members 9 have outwardly projecting knuckles 10 adjacent the upper and lower ends thereof and the hinge members 8 have projecting knuckles 11 which fit between the knuckles 10 and the two members of each hinge are held together by means of a hinge pin 12 passing through the interfitting knuckles 10 and 11 of the hinge members.

Each of the hinge members 8 has diametrically opposite shoulders 13 extending the full length thereof which engage with shoulders 14 extending the full length of the hinge member 9, the interengaging shoulders 13 and 14 permitting pivotal movement through a small angle only. The shoulders 13 and 14 along the front or outer sides of the hinge members come into engagement when the lenses have moved into a position in which they lie substantially in the same plane as indicated in dotted lines in Fig. 2 and the shoulders 13 and 14 on the inner sides of the hinges come into engagement when the lenses are swung inwardly to a position in which the spectacle frame conforms substantially to the face of the wearer, as shown in full lines in Fig. 2 of the drawing.

It will be readily apparent that by bending the bridge 4, the angularity of the hinges may be adjusted to increase or decrease the bow of the spectacle frame, to increase or decrease the space between the lenses, or to change the relative angular positions of the lenses. The nose piece supporting stem 5 may be bent to adjust the nose piece upwardly or downwardly or inwardly or outwardly to provide a comfortable support for the spectacles on the nose of the wearer.

What I claim is:

Spectacles comprising a pair of lenses and lens supporting and spacing means comprising an upwardly arched bridge formed of a readily bendable material, and elongated hinges disposed transversely of the ends of the bridge and connecting the ends of the bridge to the lenses, each hinge comprising an elongated member integrally joined intermediate its ends to an end of the bridge and an elongated member rigidly attached to the inner end portion of a lens, said members having interfitting knuckles extending throughout their length provided with alined apertures, and a pintle extending through said apertures, said members having interengaging shoulders on opposite sides of the pintel limiting the pivotal movement of the hinge members in either direction.

In testimony whereof I affix my signature.

LOUISE C. KING.